US011676002B2

(12) United States Patent
Sun

(10) Patent No.: US 11,676,002 B2
(45) Date of Patent: Jun. 13, 2023

(54) NEURAL NETWORK ACCELERATING METHOD AND DEVICE WITH EFFICIENT USAGE OF TOTAL VIDEO MEMORY SIZE OF GPUS

(71) Applicant: INSPUR SUZHOU INTELLIGENT TECHNOLOGY CO., LTD., Jiangsu (CN)

(72) Inventor: Hongyan Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/793,732

(22) PCT Filed: Aug. 26, 2020

(86) PCT No.: PCT/CN2020/111401
§ 371 (c)(1),
(2) Date: Jul. 19, 2022

(87) PCT Pub. No.: WO2021/143143
PCT Pub. Date: Jul. 22, 2021

(65) Prior Publication Data
US 2023/0091385 A1    Mar. 23, 2023

(30) Foreign Application Priority Data

Jan. 19, 2020    (CN) .......................... 202010060295.7

(51) Int. Cl.
*G06N 3/04* (2023.01)
*G06N 3/0499* (2023.01)

(52) U.S. Cl.
CPC .................................. *G06N 3/0499* (2023.01)

(58) Field of Classification Search
None
See application file for complete search history.

(56) References Cited

U.S. PATENT DOCUMENTS

2018/0307984 A1    10/2018    Koker et al.
2019/0294413 A1    9/2019    Vantrease et al.

FOREIGN PATENT DOCUMENTS

CN    104572587 A    4/2015
CN    109902808 A    6/2019
(Continued)

OTHER PUBLICATIONS

Jiang, Zixuan, et al., An Efficient Training Framework for Reversible Neural Architectures, Computer Vision—ECCV 2020: 16th European Conference, Glasgow, UK, Aug. 23-28, 2020, Proceedings, Part XXVII 16. Springer International Publishing, 2020; Total Pages: 16 (Year: 2020).*

(Continued)

*Primary Examiner* — Alan Chen
(74) *Attorney, Agent, or Firm* — Cooper Legal Group, LLC

(57) ABSTRACT

A neural network accelerating method and device includes: reading a total video memory size available for a GPU to execute computing of a neural network, setting a size of a configurable level, and determining a finest granularity of a factor used for splitting a workspace; generating an optimal acceleration solution architecture for determining an optimal batchsize and an optimal network layer configuration that enable fastest convolution execution; generating a state transition equation for a multiple knapsack problem by taking a convolution operation efficiency boundary condition in the optimal acceleration solution architecture as a fitness function; iterating the state transition equation by using a genetic algorithm taking a forward and back convolution function as evaluation bases until a convergent batchsize and network layer configuration are obtained, and accelerating the neural network by taking the convergent (Continued)

US 11,676,002 B2

Page 2 batchsize and the network layer configuration as the optimal batchsize and the optimal network layer configuration.

20 Claims, 2 Drawing Sheets

(56) References Cited

FOREIGN PATENT DOCUMENTS

| CN | 110443357 A | 11/2019 |
| CN | 110633785 A | 12/2019 |
| CN | 111260036 A | 6/2020 |

OTHER PUBLICATIONS

Wei et al., Overcoming Data Transfer Bottlenecks in FPGA-based DNN Accelerators via Layer Conscious Memory Management, DAC '19, Jun. 2-6, 2019, Las Vegas, NV, USA; Total Pages: 6 (Year: 2019).*

Paliwal et al., Reinforced Genetic Algorithm Learning for Optimizing Computation Graphs, arXiv: 1905.02494v3 [cs.LG] Sep. 26, 2019; pp. 1-22 (Year: 2019).*

International Search Report and English Translation cited in PCT/CN2020/111401 dated Dec. 2, 2020, 5 pages.

Written Opinion and English Translation cited in PCT/CN2020/111401 dated Dec. 2, 2020, 9 pages.

* cited by examiner

NEURAL NETWORK ACCELERATING METHOD AND DEVICE WITH EFFICIENT USAGE OF TOTAL VIDEO MEMORY SIZE OF GPUS

This application claims priority to Chinese Patent Application No. 202010060295.7, filed on Jan. 19, 2020, in China National Intellectual Property Administration and entitled "Neural Network Accelerating Method and Device", the contents of which are hereby incorporated by reference in its entirety.

FIELD

The present disclosure relates to the field of neural network training, and more particularly to a neural network accelerating method and device.

BACKGROUND

With the development of scientific computing technologies, neural network has been developed rapidly. Meanwhile, due to the increasing programmability of Graphics Processing Unit (GPU), the applicability of GPUs has been continuously extended to new fields, far beyond graphics rendering tasks. GPU is applied extensively to neural network training and inference by virtue of its high concurrent processing capability. Currently, inference is implemented mainly by TensorRT of NVIDIA that calls Compute Unified Device Architecture (CUDA) Deep Neural Network (cuDNN) to accelerate inference.

With the development of GPU technologies, the computation amount of parallel computing already may reach the level of Tflops, which may provide a high inference speed for a neural network but still cannot meet requirements of increasing training and inference tasks. Therefore, how to utilize a GPU more efficiently becomes the key. The cuDNN, a dynamic library developed by NVIDIA specially for deep learning, may execute forward convolution, backward convolution, matrix multiplication, and other operations in deep learning. Each operation needs to occupy a certain size (i.e., workspace size) of video memory, and is also related to a dimension of an input matrix. The same applies to backward convolution.

UCUDNN is developed based on cuDNN. The emergence of the UCUDNN gives such an idea for the efficient use of a GPU that, in a limited video memory space (under a workspace size limit), a batchsize is split into smaller batchsizes and a fastest algorithm is selected, thereby not only accelerating network training but also reducing the occupation of the video memory. However, the UCUDNN has such an obvious shortcoming that, in case that the workspace size limit is not considered during network training (namely the workspace size is large enough), the fastest algorithm for convolution may occupy the largest workspace (namely the size of the video memory occupied by convolution is in a linear relationship with the fastest algorithm for convolution), so the UCUDNN does not work in acceleration.

For the problem in the prior art that a deep learning dynamic library does not work in acceleration when a video memory is large enough, there is not effective solution currently yet.

SUMMARY

In view of this, an objective of embodiments of the present disclosure is to disclose a neural network accelerating method and device, which may improve the neural network operating speed of a deep learning dynamic library in any size of video memory, thereby improving the utilization rate and working efficiency of a GPU.

Based on the above objective, a first aspect of the embodiments of the present disclosure provides a neural network accelerating method, including following steps:

reading a total video memory size available for a GPU to execute computing of a neural network, setting a size of a configurable level, and determining, based on the size of the configurable level, a finest granularity of a factor used for splitting a workspace;

generating, according to the total video memory size, the size of the configurable level, and the finest granularity, an optimal acceleration solution architecture for determining an optimal batchsize and an optimal network layer configuration that enable fastest convolution execution;

generating a state transition equation for a multiple knapsack problem based on the optimal batchsize, convolution time complexity, and convolution space complexity by taking a convolution operation efficiency boundary condition in the optimal acceleration solution architecture as a fitness function; and iterating the state transition equation by using a genetic algorithm taking a forward convolution function and a backward convolution function as evaluation bases until a convergent batchsize and network layer configuration are obtained, and accelerating the neural network by taking the convergent batchsize and the network layer configuration as the optimal batchsize and the optimal network layer configuration.

In some embodiments, the optimal acceleration solution architecture includes the convolution operation efficiency boundary condition, a video memory maximum boundary condition, and a configuration boundary condition of each layer of the neural network.

In some embodiments, the optimal acceleration solution architecture is a Non-deterministic Polynomial (NP) complete problem.

In some embodiments, the forward convolution function and the backward convolution function include following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

In some embodiments, a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

A second aspect of the embodiments of the present disclosure provides a neural network accelerating device, including:

a processor; and a memory, storing a computer instruction executable by the processor. The instruction is executed by the processor to implement following steps:

reading a total video memory size available for a GPU to execute computing of a neural network, setting a size of a configurable level, and determining, based on the size of the configurable level, a finest granularity of a factor used for splitting a workspace;

generating, according to the total video memory size, the size of the configurable level, and the finest granularity, an optimal acceleration solution architecture for determining an optimal batchsize and an optimal network layer configuration that enable fastest convolution execution;

generating a state transition equation for a multiple knapsack problem based on the optimal batchsize, convolution time complexity, and convolution space complexity by taking a convolution operation efficiency boundary condition in the optimal acceleration solution architecture as a fitness function; and iterating the state transition equation by using a genetic algorithm taking a forward convolution function and a backward convolution function as evaluation bases until a convergent batchsize and network layer configuration are obtained, and accelerating the neural network by taking the convergent batchsize and the network layer configuration as the optimal batchsize and the optimal network layer configuration.

In some embodiments, the optimal acceleration solution architecture includes the convolution operation efficiency boundary condition, a video memory maximum boundary condition, and a configuration boundary condition of each layer of the neural network.

In some embodiments, the optimal acceleration solution architecture is an NP complete problem.

In some embodiments, the forward convolution function and the backward convolution function include following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

In some embodiments, a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

The present disclosure has the following beneficial technical effects. According to the neural network accelerating method and device provided in the embodiments of the present disclosure, a total video memory size available for a GPU to execute computing of a neural network is read, a size of a configurable level is set, and a finest granularity of a factor used for splitting a workspace is determined based on the size of the configurable level; an optimal acceleration solution architecture for determining an optimal batchsize and an optimal network layer configuration that enable fastest convolution execution is generated according to the total video memory size, the size of the configurable level, and the finest granularity; a state transition equation for a multiple knapsack problem based on the optimal batchsize, convolution time complexity, and convolution space complexity is generated by taking a convolution operation efficiency boundary condition in the optimal acceleration solution architecture as a fitness function; and the state transition equation is iterated by using a genetic algorithm taking a forward convolution function and a backward convolution function as evaluation bases until a convergent batchsize and network layer configuration are obtained, and the neural network is accelerated by taking the convergent batchsize and the network layer configuration as the optimal batchsize and the optimal network layer configuration. With the technical solution, the neural network operating speed of a deep learning dynamic library may be improved in any size of video memory environments, thereby improving the utilization rate and working efficiency of a GPU.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other drawings according to these drawings without creative work.

DETAILED DESCRIPTION

In order to make the objective, technical solutions, and advantages of the present disclosure clearer, the embodiments of the present disclosure will further be described below in detail in combination with embodiments and with reference to the drawings.

It is to be noted that all expressions made with "first", "second", etc., in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Figure 1:
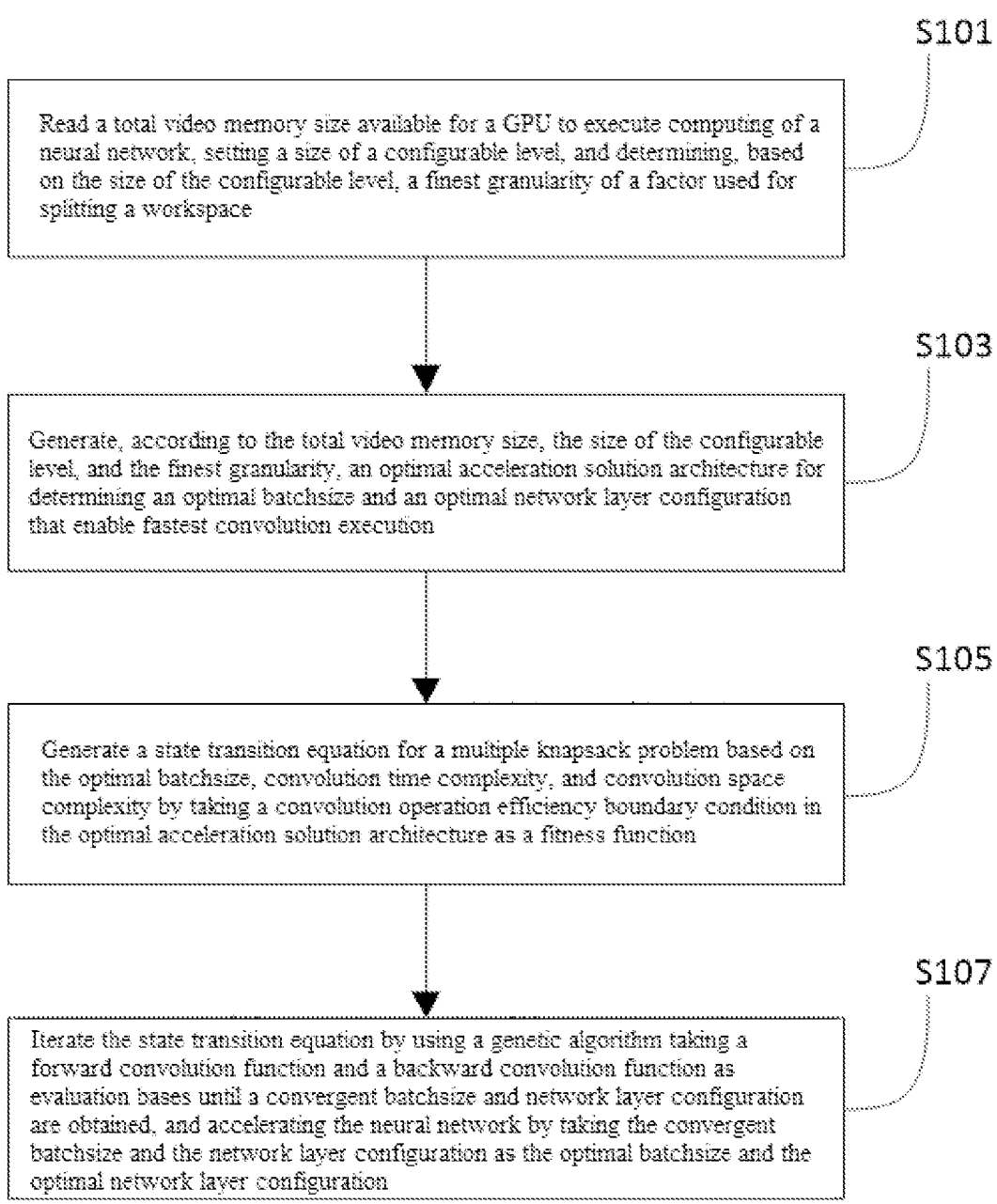
FIG. 1 is a schematic flowchart of a neural network accelerating method according to the present disclosure.

Based on the above objective, a first aspect of the embodiments of the present disclosure discloses an embodiment of a neural network accelerating method. By the method, the neural network operating speed of a deep learning dynamic library may be improved in any size of video memory environments. FIG. 1 is a schematic flowchart of a neural network accelerating method according to the present disclosure.

As shown in FIG. 1, the neural network accelerating method includes the following steps.

In step S101, a total video memory size available for a GPU to execute computing of a neural network is read, a size of a configurable level is set, and a finest granularity of a factor used for splitting a workspace is determined based on the size of the configurable level.

In step S103, an optimal acceleration solution architecture for determining an optimal batchsize and an optimal network layer configuration that enable fastest convolution execution is generated according to the total video memory size, the size of the configurable level, and the finest granularity.

In step S105, a state transition equation for a multiple knapsack problem based on the optimal batchsize, convolution time complexity, and convolution space complexity is generated by taking a convolution operation efficiency boundary condition in the optimal acceleration solution architecture as a fitness function.

In step S107, the state transition equation is iterated by using a genetic algorithm taking a forward convolution function and a backward convolution function as evaluation bases until a convergent batchsize and network layer configuration are obtained, and the neural network is accelerated by taking the convergent batchsize and the network layer configuration as the optimal batchsize and the optimal network layer configuration.

Those ordinarily skilled in the art can understand that all or part of the processes in the method of the above-mentioned embodiment may be completed by a computer program by instructing related hardware. The program may be stored in a computer-readable storage medium. When the program is executed, the processes of each method embodiment may be included. The storage medium may be a magnetic disk, an optical disk, a Read-Only Memory (ROM), a Random Access Memory (RAM), etc. The embodiment of the computer program may have effects the same as or similar to those in any corresponding method embodiment.

In some embodiments, the optimal acceleration solution architecture includes the convolution operation efficiency boundary condition, a video memory maximum boundary condition, and a configuration boundary condition of each layer of the neural network.

In some embodiments, the optimal acceleration solution architecture is an NP complete problem.

In some embodiments, the forward convolution function and the backward convolution function include the following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

In some embodiments, a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

The method disclosed according to the embodiments of the present disclosure may also be implemented as a computer program executed by a Central Processing Unit (CPU). The computer program may be stored in a computer-readable storage medium.

When the computer program is executed by the CPU, the functions defined in the method disclosed in the embodiments of the present disclosure are executed. The above method steps and system units may also be implemented by a controller and a computer-readable storage medium configured to store a computer program enabling the controller to implement the steps or functions of the units.

An embodiment of the present disclosure will further be described below according to an embodiment.

When a workspace size is large enough, solving an optimal acceleration process is equivalent to solving an NP complete problem.

$$\text{Min. } T = B_k(c) / \sum_{k \in K} \sum_{c \in C_k} T_k(c) x_{k,c} \quad (1)$$

-continued $$\text{Subject to. } \sum_{k \in K} \sum_{c \in C_k} B_k(c) M_k(c) x_{k,c} \leq M \quad (2)$$

$$\sum_{k \in K} x_{k,c} = 1 (\forall k \in K) \quad (3)$$

$$x_{k,c} \in \{0,1\} (\forall k \in K, \forall c \in C_k) \quad (4)$$

$M_k(c)$ and $T_k(c)$ represent an execution space size and execution time of convolution respectively. $B_k(c)$ represents a batchsize under a current configuration. $x_{k,c}$ represents a configuration when a network layer is layer k, and indicates that the current configuration is selected when being valued to 1. In formula (2), M represents a video memory size of the GPU. Formula (1) takes batchsize/s as the unit, and evaluates the convolution operation efficiency of the UCUDNN. $C_k$ represents a configurable set when the network layer is k. K is the total number of network layers.

It can be seen according to the formulas that the search complexity of the configurable set is quite high, about $$\sum_{c \in M/M_{min}} |K||A|^{B(c)},$$

wherein $M_{min}$ represents a convolution algorithm occupying a smallest workspace size is selected currently, and clearly, it is impossible to implement searching in practical operations. Therefore, this problem is converted into a multiple knapsack problem. A state transition equation for the multiple knapsack problem is as follows:

$f[i][v] = \min\{f[i-1][W - \Sigma B_k(c) \Box M_k(c)] + B_k(c) \Box T_k(c)$
$|0 \leq B_k(c) \leq v\}.$ The fitness function is formula (1).

Finally, a genetic algorithm is used to search for a global optimal solution. The size of the configurable set $C_k$ is set, and a finest granularity value of a factor for splitting the workspace is determined. When a maximum configuration value of $C_k$ is 32, the finest granularity for splitting the workspace may be 1/32. The value of M may be selected to obtain the video memory size based on information of the GPU.

For example, it is set that the number is 40, the maximum number of iterations is 2,000, the dimension of the variate is the network layer number of the neural network plus one, the number of binary bits of the variate is 20, the mutation probability is 0.1, and the crossover probability is 0.9. The batchsize in training is usually a multiple of 2, so 2 may be taken as the coding step size. The network parameter configuration of each layer is 1/n (n is a configuration in $C_k$ in formula (1)), representing the factor for splitting the workspace. With respect to the selection of a micro batchsize and an algorithm after splitting in the network, the batchsize is progressively decreased to obtain exact values of the space and the algorithm, and the exact values are compared with a current fastest algorithm to find a proper micro batchsize and algorithm.

The following functions are used to obtain WorkspaceSize and Algorithm respectively: cudnn Get Convolution Backward Data Workspace Size as well as cudnn Get Convolution Backward Data Algorithm, cudnn Get Convolution Backward Filter Workspace Size as well as cudnn Get Convolution Backward Filter Algorithm (backward convolution), and cudnn Get Convolution Forward Workspace Size as well as cudnn Get Convolution Forward Algorithm (forward convolution). Optimal values may be found finally by iteration of the genetic algorithm.

It can be seen from the above embodiment that, according to the neural network accelerating method provided in the embodiment of the present disclosure, a total video memory size available for a GPU to execute computing of a neural network is read, a size of a configurable level is set, and a finest granularity of a factor used for splitting a workspace is determined based on the size of the configurable level; an optimal acceleration solution architecture for determining an optimal batchsize and optimal network layer configuration that enable fastest convolution execution is generated according to the total video memory size, the size of the configurable level, and the finest granularity; a state transition equation for a multiple knapsack problem based on the optimal batchsize, convolution time complexity, and convolution space complexity is generated by taking a convolution operation efficiency boundary condition in the optimal acceleration solution architecture as a fitness function; and the state transition equation is iterated by using a genetic algorithm taking a forward convolution function and a backward convolution function as evaluation bases until a convergent batchsize and network layer configuration are obtained, and the neural network is accelerated by taking the convergent batchsize and the network layer configuration as the optimal batchsize and the optimal network layer configuration. With the technical solution, the neural network operating speed of a deep learning dynamic library may be improved in any size of video memory environments, thereby improving the utilization rate and working efficiency of a GPU.

It is to be pointed out that the steps in each embodiment of the neural network accelerating method may be mutually intersected, replaced, added, and deleted.

Therefore, these reasonable permutations, combinations, and transformations about the neural network accelerating method shall also fall within the scope of protection of the present disclosure, and the scope of protection of the present disclosure should not be limited to the embodiments.

Figure 2:
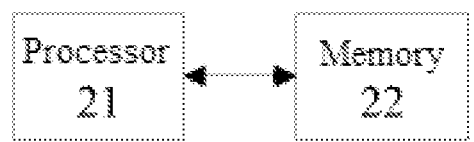
FIG. 2 is a schematic block diagram of a neural network accelerating device according to the present disclosure.

Based on the above objective, a second aspect of the embodiments of the present disclosure discloses an embodiment of a neural network accelerating device, as shown in FIG. 2. By the device, the neural network operating speed of a deep learning dynamic library may be improved in any size of video memory environments. The neural network accelerating device includes:
  a processor 21; and
  a memory 22, storing a computer instruction executable by the processor 21. The instruction is executed by the processor 21 to implement the following steps:
    reading a total video memory size available for a GPU to execute computing of a neural network, setting a size of a configurable level, and determining, based on the size of the configurable level, a finest granularity of a factor used for splitting a workspace;
    generating, according to the total video memory size, the size of the configurable level, and the finest granularity, an optimal acceleration solution architecture for determining an optimal batchsize and an optimal network layer configuration that enable fastest convolution execution;
    generating a state transition equation for a multiple knapsack problem based on the optimal batchsize, convolution time complexity, and convolution space complexity by taking a convolution operation efficiency boundary condition in the optimal acceleration solution architecture as a fitness function; and
    iterating the state transition equation by using a genetic algorithm taking a forward convolution function and a backward convolution function as evaluation bases until a convergent batchsize and network layer configuration are obtained, and accelerating the neural network by taking the convergent batchsize and the network layer configuration as the optimal batchsize and the optimal network layer configuration.

In some embodiments, the optimal acceleration solution architecture includes the convolution operation efficiency boundary condition, a video memory maximum boundary condition, and a configuration boundary condition of each layer of the neural network.

In some embodiments, the optimal acceleration solution architecture is an NP complete problem.

In some embodiments, the forward convolution function and the backward convolution function include the following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

In some embodiments, a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

It can be seen from the above embodiment that, according to the neural network accelerating device provided in the embodiment of the present disclosure, a total video memory size available for a GPU to execute computing of a neural network is read, a size of a configurable level is set, and a finest granularity of a factor used for splitting a workspace is determined based on the size of the configurable level; an optimal acceleration solution architecture for determining an optimal batchsize and optimal network layer configuration that allow fastest convolution execution is generated according to the total video memory size, the size of the configurable level, and the finest granularity; a state transition equation for a multiple knapsack problem based on the optimal batchsize, convolution time complexity, and convolution space complexity is generated by taking a convolution operation efficiency boundary condition in the optimal acceleration solution architecture as a fitness function; and the state transition equation is iterated by using a genetic algorithm taking a forward convolution function and a backward convolution function as evaluation bases until a convergent batchsize and network layer configuration are obtained, and the neural network is accelerated by taking the convergent batchsize and the network layer configuration as the optimal batchsize and the optimal network layer configuration. With the technical solution, the neural network operating speed of a deep learning dynamic library may be improved in any size of video memory environments, thereby improving the utilization rate and working efficiency of a GPU.

It is to be pointed out that a working process of each module is described in the embodiment of the neural network accelerating device with the embodiment of the neural network accelerating method, and application of these modules to other embodiments of the neural network accelerating method is apparent to those skilled in the art. Certainly, since the steps in the embodiment of the neural network accelerating method may be mutually intersected, replaced, added, and deleted, these reasonable permutations, combinations, and transformations about the neural network accelerating device shall also fall within the scope of protection of the present disclosure, and the scope of protection of the present disclosure should not be limited to the embodiments.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A neural network accelerating method, comprising:
reading a total video memory size available for a Graphics Processing Unit (GPU) to execute computing of a neural network, setting a size of a configurable level, and determining, based on the size of the configurable level, a finest granularity of a factor used for splitting a workspace;
generating, according to the total video memory size, the size of the configurable level, and the finest granularity, an optimal acceleration solution architecture for determining an optimal batchsize and an optimal network layer configuration that enable fastest convolution execution;
generating a state transition equation for a multiple knapsack problem based on the optimal batchsize, convolution time complexity, and convolution space complexity by taking a convolution operation efficiency boundary condition in the optimal acceleration solution architecture as a fitness function; and
iterating the state transition equation by using a genetic algorithm taking a forward convolution function and a backward convolution function as evaluation bases until a convergent batchsize and network layer configuration are obtained, and accelerating the neural network by taking the convergent batchsize and the network layer configuration as the optimal batchsize and the optimal network layer configuration.

2. The method according to claim 1, wherein the optimal acceleration solution architecture comprises the convolution operation efficiency boundary condition, a video memory maximum boundary condition, and a configuration boundary condition of each layer of the neural network.

3. The method according to claim 1, wherein the optimal acceleration solution architecture is a Non-deterministic Polynomial (NP) complete problem.

4. The method according to claim 3, wherein solving an optimal acceleration process is equivalent to solving the NP complete problem, by a formula of:

$$\text{Min. } T = B_k(c)/\Sigma\Sigma T_k(c)x_{k,c} \tag{1}$$

wherein $T_k(c)$ represent an execution time of convolution.

5. The method according to claim 4, wherein the formula (1) is subject to:

$$\sum_{k \in K}\sum_{c \in C_k} B_k(c)M_k(c)x_{k,c} \le M \tag{2}$$

$$\sum_{k \in K} x_{k,c} = 1 (\forall k \in K) \tag{3}$$

$$x_{k,c} \in \{0,1\}(\forall k \in K, \forall c \in C_k) \tag{4}$$

wherein $M_k(c)$ represent an execution space size of convolution, $B_k(c)$ represents a batchsize under a current configuration, $x_{k,c}$ represents a configuration in response to a network layer being layer k, and indicates that the current configuration is selected in case of being valued to 1, M represents a video memory size of the GPU, $C_k$ represents a configurable set in response to the network layer being k, and K is a total number of network layers.

6. The method according to claim 5, wherein a search complexity of the configurable set is:

$$\sum_{c \in M/M_{min}} |K||A|^{B(c)}$$

wherein $M_{min}$ represents a convolution algorithm occupying a smallest workspace size being selected.

7. The method according to claim 6, wherein the multiple knapsack problem is solved by:

$$f[i][v]=\min\{f[i-1][W-\Sigma B_k(c)\uparrow M_k(c)]+B_k(c)\square T_k(c)$$
$$|0<=B_k(c)\square M_k(c)<=v\}.$$

8. The method according to claim 7, wherein a maximum configuration value of $C_k$ is 32, and the finest granularity for splitting the workspace is 1/32.

9. The method according to claim 1, wherein the forward convolution function and the backward convolution function comprise following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

10. The method according to claim 1, wherein a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

11. A neural network accelerating device, comprising:
at least one processor; and
a memory, storing a computer instruction executable by the at least one processor, wherein the computer instruction is executed by the at least one processor to cause the at least one processor to:
- read a total video memory size available for a Graphics Processing Unit (GPU) to execute computing of a neural network, set a size of a configurable level, and determine, based on the size of the configurable level, a finest granularity of a factor used for splitting a workspace;
- generate, according to the total video memory size, the size of the configurable level, and the finest granularity, an optimal acceleration solution architecture for determining an optimal batchsize and an optimal network layer configuration that enable fastest convolution execution;
- generate a state transition equation for a multiple knapsack problem based on the optimal batchsize, convolution time complexity, and convolution space complexity by taking a convolution operation efficiency boundary condition in the optimal acceleration solution architecture as a fitness function; and
- iterate the state transition equation by using a genetic algorithm taking a forward convolution function and a backward convolution function as evaluation bases until a convergent batchsize and network layer configuration are obtained, and accelerate the neural network by taking the convergent batchsize and the network layer configuration as the optimal batchsize and the optimal network layer configuration.

12. The device according to claim 11, wherein the optimal acceleration solution architecture comprises the convolution operation efficiency boundary condition, a video memory maximum boundary condition, and a configuration boundary condition of each layer of the neural network.

13. The device according to claim 11, wherein the optimal acceleration solution architecture is a Non-deterministic Polynomial (NP) complete problem.

14. The device according to claim 13, wherein solving an optimal acceleration process is equivalent to solving the NP complete problem, by a formula of:

$$\text{Min. } T = B_k(c) / \Sigma\Sigma T_k(c) x_{k,c} \quad (1)$$

wherein $T_k(c)$ represent an execution time of convolution.

15. The device according to claim 14, wherein the formula (1) is subject to:

$$\sum_{k \in K} \sum_{c \in C_k} B_k(c) M_k(c) x_{k,c} \leq M \quad (2)$$

$$\sum_{k \in K} x_{k,c} = 1 (\forall k \in K) \quad (3)$$

$$x_{k,c} \in \{0,1\} (\forall k \in K, \forall c \in C_k) \quad (4)$$

wherein $M_k(c)$ represent an execution space size of convolution, $B_k(c)$ represents a batchsize under a current configuration, $x_k c$ represents a configuration in response to a network layer being layer k, and indicates that the current configuration is selected in case of being valued to 1, M represents a video memory size of the GPU, $C_k$ represents a configurable set in response to the network layer being k, and K is a total number of network layers.

16. The device according to claim 15, wherein a search complexity of the configurable set is:

$$\sum_{c \in M/M_{min}} |K||A|^{B(c)}$$

wherein $M_{min}$ represents a convolution algorithm occupying a smallest workspace size being selected.

17. The device according to claim 16, wherein the multiple knapsack problem is solved by:

$$f[i][v] = \min\{f[i-1][W-\Sigma B_k(c)\Box M_k(c)] + B_k(c)\Box T_k(c)$$
$$10 \leq = B_k(c)_k(c) \leq = v\}.$$

18. The device according to claim 17, wherein a maximum configuration value of $C_k$ is 32, and the finest granularity for splitting the workspace is 1/32.

19. The device according to claim 11, wherein the forward convolution function and the backward convolution function comprise following functions provided by a dynamic library UCUDNN of the GPU: a forward convolution workspace size function, a forward convolution working algorithm function, a backward convolution data workspace size function, a backward convolution data working algorithm function, a backward convolution filter workspace size function, and a backward convolution filter working algorithm function.

20. The device according to claim 11, wherein a number of the genetic algorithm is 40, a maximum number of iterations is 2,000, a dimension of a variate is a network layer number of the neural network plus one, a number of binary bits of the variate is 20, a mutation probability is 0.1, a crossover probability is 0.9, a coding step size is 2, and a network parameter configuration of each layer is a reciprocal of the size of the configurable level.

* * * * *